United States Patent [19]

Hardwick

[11] 4,314,286
[45] Feb. 2, 1982

[54] TRIBIT SERVO TRACK DETECTOR

[75] Inventor: John F. Hardwick, Fife, Scotland

[73] Assignee: Burroughs Corporation, Detroit, Mich.

[21] Appl. No.: 112,975

[22] Filed: Jan. 17, 1980

[30] Foreign Application Priority Data

Jul. 18, 1979 [GB] United Kingdom ............... 25060/79

[51] Int. Cl.³ .............................................. G11B 5/09
[52] U.S. Cl. ...................................................... 360/40
[58] Field of Search ................................... 360/40, 77

[56] References Cited

U.S. PATENT DOCUMENTS

| | | | |
|---|---|---|---|
| 3,864,741 | 2/1975 | Schwarz | 360/77 |
| 3,879,752 | 4/1975 | Heidecker | 360/40 |
| 4,032,984 | 6/1977 | Kaser et al. | 360/77 |
| 4,101,942 | 7/1978 | Jacques | 360/77 |

*Primary Examiner*—Vincent P. Canney

*Attorney, Agent, or Firm*—Howard W. Califano; Kevin R. Peterson; Edmund M. Chung

[57] ABSTRACT

An apparatus is provided for distinguishing a tribit servo track from other signals appearing on a rotating disk magnetic information storage media. The apparatus comprises circuit elements which detect for the concurrence of several characteristic features which differentiate the servo signal from data, inter-data-track beat-frequency signals, and noise, also picked up by the transducer head. Upon coincidence of all of the characteristic features tested for, along with an indication that the transducer head has been coarsely positioned over the servo track, a tri-bit-present signal is generated. Among the characteristic features tested for are proper timing of synchronization pulses, proper time relation between synchronization pulse and first positioning pulse, and the occurrence of two positioning pulses for every synchronization pulse.

10 Claims, 6 Drawing Figures

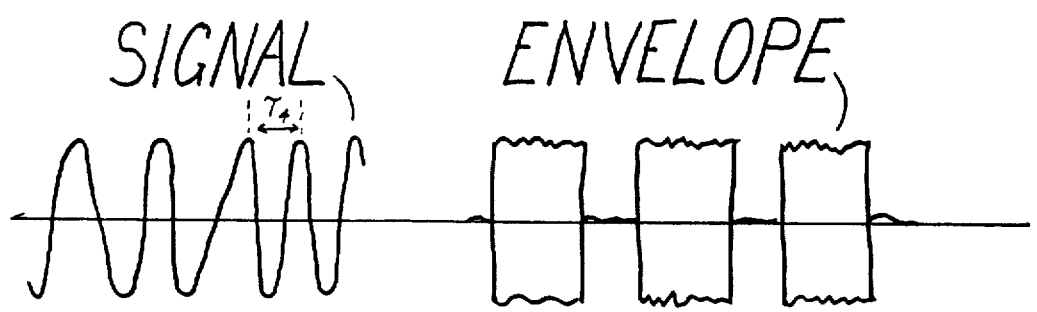
FIGURE 3A: DATA
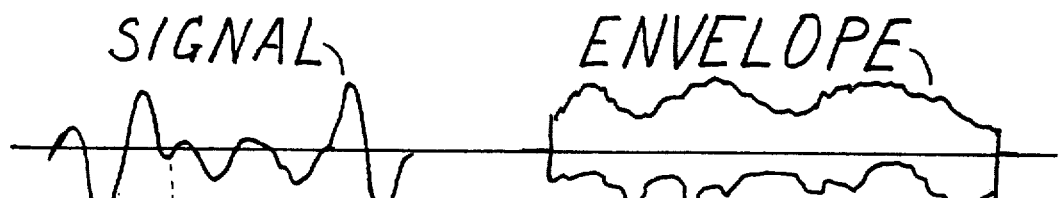
FIGURE 3B: DATA BEATS
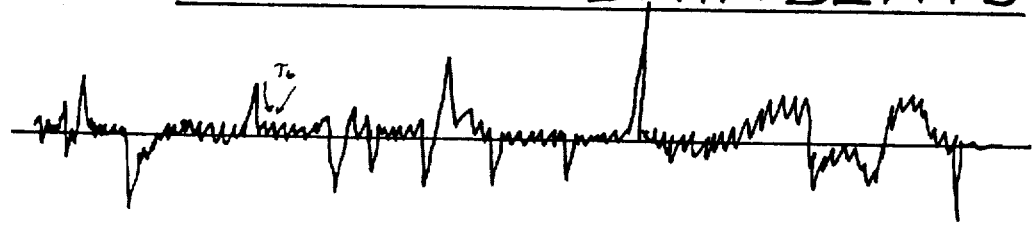
FIGURE 4: NOISE 4,314,286

TRIBIT SERVO TRACK DETECTOR

BACKGROUND OF THE INVENTION

1. Field of the Invention

The invention relates generally to apparatus for detecting one unique signal located among other signals recorded on a magnetic medium, and in particular relates to apparatus for distinguishing the positioning servo track from other signals appearing on a magnetic disk storage system.

2. Description of the Prior Art

The prior art does not disclose an efficient system of high design simplicity for distinguishing tribit servo signals from data, noise, and inter-data-track beat-frequency signals on a rotating disk information storage system.

OBJECT OF THE INVENTION

It is an object of this invention, therefore, to provide an apparatus for distinguishing tribit servo signals from non-servo signals detected on a rotating disk information storage system.

It is another object of this invention to provide such an apparatus which performs its distinguishing function by testing for the concurrence of a plurality of the signal's characteristic features.

It is another object of this invention to provide such an apparatus having high design simplicity featuring digital components.

SUMMARY OF THE INVENTION

These and other objects are achieved by the invention which locates a servo signal by checking for the presence and concurrence of a plurality of the signal's characteristic features.

Other objects, features, and advantages will be readily apparent from the following detailed description when considered with the accompanying drawings which show by way of example and not limitation the principle of the invention and the preferred mode of applying that principle.

BRIEF DESCRIPTION OF THE DRAWINGS

FIG. 3 consisting of FIGS. 3A and 3B shows the typical output pattern from data and inter-data-track beat-frequency signals read from a rotating disk information storage device.

FIG. 4 shows a noise output pattern detected by the transducer head in the absence of either tribit servo signals or data.

DESCRIPTION OF THE PREFERRED EMBODIMENT

Figure 2:
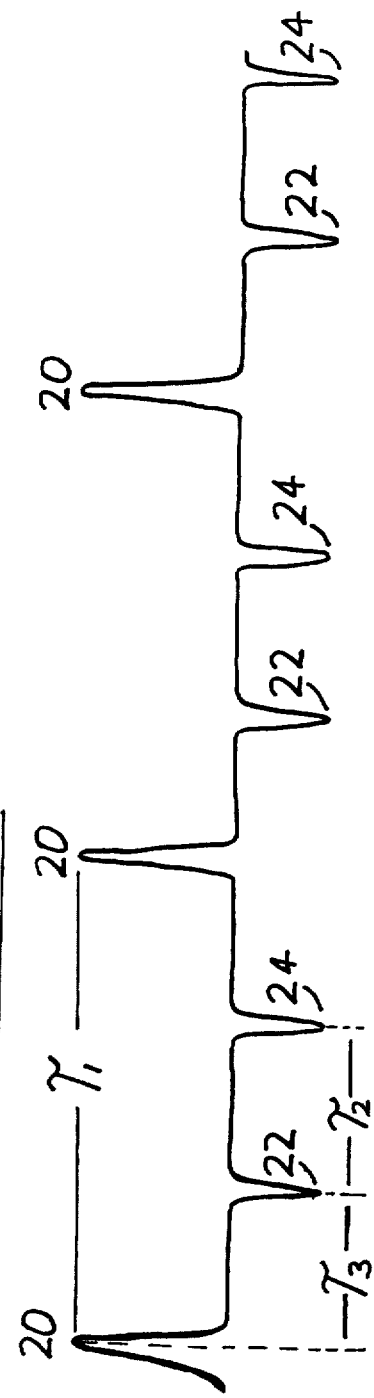
FIG. 2 shows the output waveform that results when an appropriate transducer device reads the standard tribit servo track.
Figure 5:
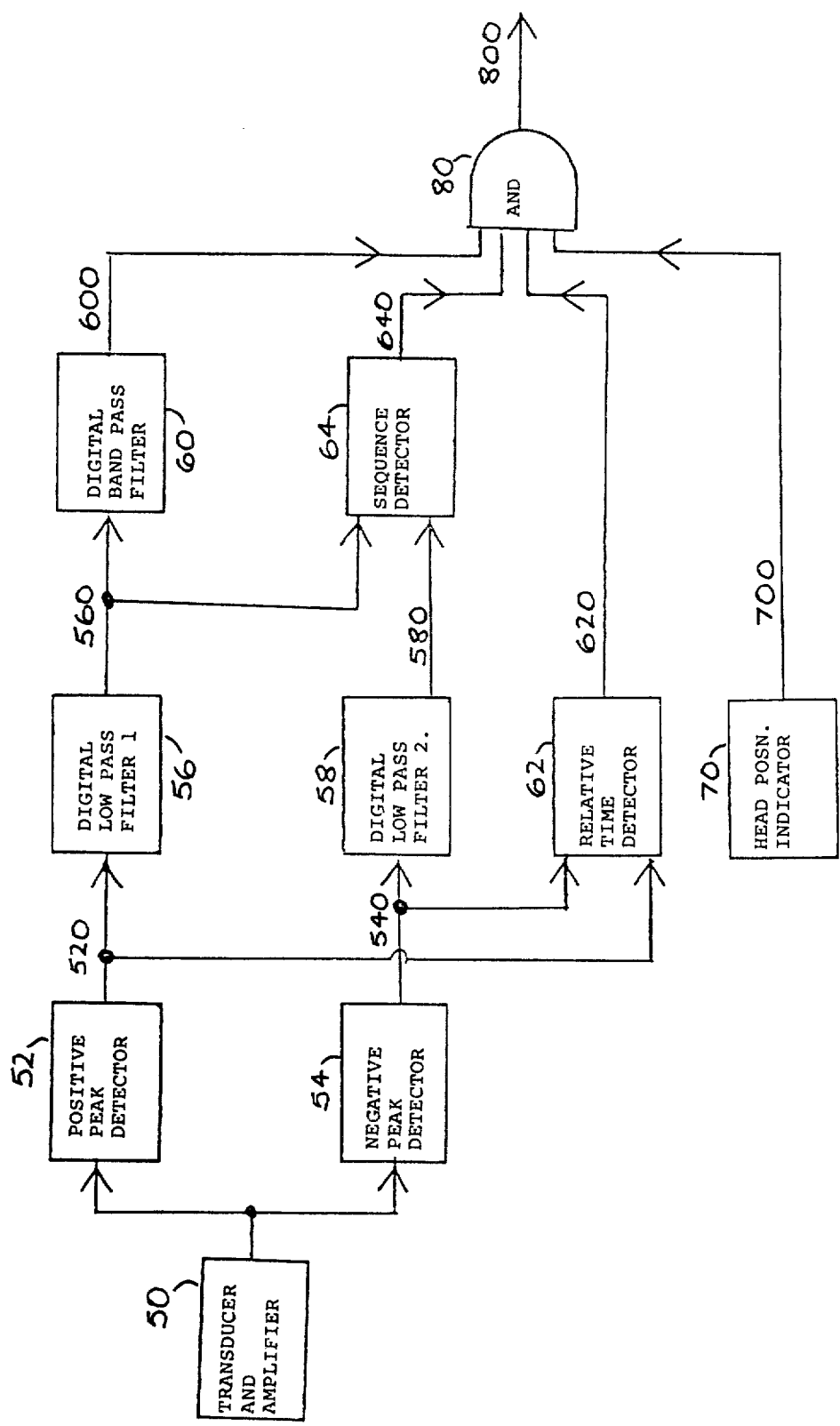
FIG. 5 shows a preferred embodiment of the present invention.

The apparatus shown in FIG. 5 operates by differentiating a FIG. 2 type signal from the signals appearing in FIGS. 3 and 4.

Figure 1:
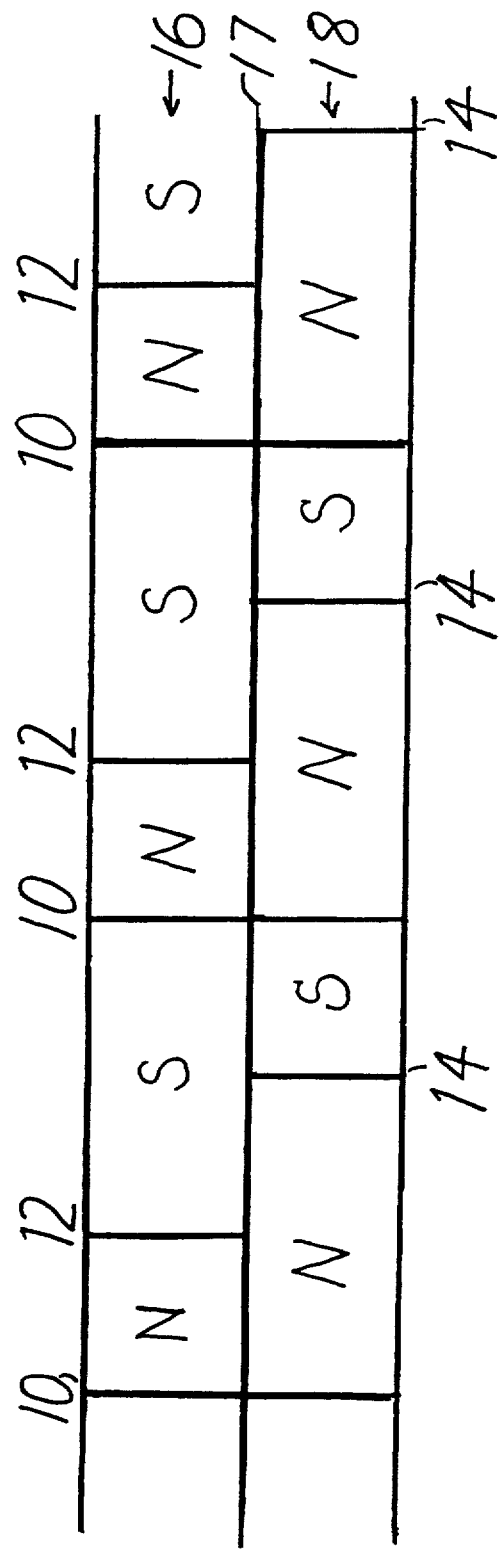
FIG. 1 shows the basic tribit servo track with its regularly-alternating magnetic domain pattern.

In FIG. 1 is shown the basic tribit servo track. Alternating north and south magnetic domains are recorded in a predetermined pattern. On either side of line 17 are domain lines 16 and 18 containing south-to-north transitions at coincident points 10 and north-to-south transitions at non-coincident points 12 and 14. As the transducer head reads the servo pattern, the coincident south-to-north transitions produce the positive pulses 20 of FIG. 2, while the non-coincident north-to-south transitions 12 and 14 produce the negative pulses 22 and 24. In a complete tribit servo system, the peaks 20 are used as synchronization pulses and the objective would be to keep the transducer head centered along central line 17 by comparing the amplitudes of the pulses 22 and 24. An equality of amplitude would indicate that the transducer head was properly centered.

FIG. 3 shows output waveforms produced by the transducer when reading data-related signals. FIG. 3A shows the output waveform when a transducer head is centered over a data channel. FIG. 3B shows the inter-data-track beat-frequency signals that result when the transducer head straddles two data tracks.

FIG. 4 shows the rapid oscilations produced when the transducer reads neither the tribit signal nor data. The output in this case consists of various spurious signals and noise.

The intervals between the coincident south-to-north transition lines 10 of FIG. 1 are chosen so that the inter-pulse period $T_1$ between positive peaks 20 of FIG. 2 is significantly greater than the maximum periods $T_4$, $T_5$, and $T_6$ between successive data peaks, successive inter-data-track beat-frequency peaks, and successive noise peaks.

In the FIG. 5 embodiment, Component 50 represents an appropriate transducer and amplifier device well known in the prior art of reproducing the signals recorded on a rotating disk information storage apparatus. Positive peak detector 52 detects the peaks 20 induced by the transition lines 10. Negative peak detector 54 detects the peaks 22 and 24 produced by the transition lines 12 and 14. The digital low pass filter 56 has a cut-off frequency period equal to or slightly greater than the $T_1$ interval between successive sync pulses 20. A second digital low pass filter 58 has a cut-off frequency with period equal to or slightly greater than the $T_2$ time interval between successive pulses 22 and 24. The digital band pass filter 60 has an upper cut-off frequency with period slightly less than the $T_1$ time interval between successive peaks 20 and a lower cut off frequency with period slightly greater than the $T_1$ interval between successive peaks 20. The allowances made in the digital band pass filter 60 would be for jitter caused by spurious influences on disk rotation and magnetic transducer operation.

The input signals to the relative time detector 62 are the output signals 520 and 540 from the positive peak detector 52 and the negative peak detector 54, respectively. The output signal 620 from the relative time detector is positive when the time relationship between a positive pulse and the first succeeding negative pulse matches, to within a given tolerance, the $T_3$ time relationship between pulses 20 and 22. The input signals to sequence detector 64 are the output signals 560 and 580 from digital low pass filter 56 and digital low pass filter 58 respectively. The output signal 640 is positive when two pulses on line 580 are received for every one pulse on line 560. The head position indicator 70 gives a positive indication on line 700 when the transducer head has been moved by a coarse positioning system to the general area of the tribit servo track.

Gate 80 outputs a signal 800 indicating that the tribit servo track has been located. The only time output 800 is positive is when positive indications are simultaneously received from all of the lines 600, 620, 640, and 700. A positive pulse on line 600 indicates that the positive peaks being detected by transducer apparatus 50 are in the same general time frame as the desired positive pulses 20 from an actual tribit signal. A positive indication on line 620 indicates that the first negative pulse following a given positive pulse has a time relationship generally the same as the $T_3$ time interval between pulses 20 and 22 from an actual tribit signal. A positive indication on line 640 indicates that the signal being detected has two negative pulses for each positive pulse as in the desired tribit signal. Finally, a positive indication on line 700 indicates that the transducer head has been moved to the general area of the tribit track. The embodiment shown in FIG. 5, therefore, produces a positive tribit present signal only upon the concurrent detection of a plurality of the characteristic features of the tribit signal.

The preceeding detailed description has presented merely as preferred embodiment of the claimed invention. It will be understood, of course, that numerous other alternative embodiments encompassing many variations in the elements and interconnections shown could be employed without departing from the spirit and scope of the invention as set forth in the appended claims.

What is claimed is:

1. An apparatus for detecting and identifying a tribit signal, the signal so tested is produced when a transducer reads a particular track on a rotary disk, said apparatus comprising:
   a sequence detector means, connected to the transducer, for detecting the presence of the tribit characteristic feature of two negative pulses for every positive pulse and producing an affirmative indication when the sequence characteristic is detected;
   a frequency testing means, connected to the transducer, for determining whether the positive pulse appears at the frequency rate characteristic of tribit signals and producing an affirmative indication when this frequency characteristic is detected; and,
   a coincidence means, connected to the output of said sequence detector means and said frequency testing means for generating a tribit-present-signal when affirmative indicators are received from said sequence detector means.

2. An apparatus for detecting and identifying a tribit signal, the signal so tested is produced when a transducer reads a particular track on a rotary disk, said apparatus comprising:
   a sequence detector means, connected to the transducer, for detecting the presence of the tribit characteristic feature of two negative pulses for every positive pulse and producing an affirmative indication when the sequence characteristic is detected;
   a relative time detecting means, connected to the transducer, for detecting the presence of the tribit characteristic feature of a negative pulse occurring at a certain time interval after the occurrence of a positive pulse and producing an affirmative indication when this relative time characteristic is detected; and,
   a coincidence means, connected to the output of said sequence detector means and said relative time detector means for generating a tribit-present-signal when affirmative indicators are received from said seqeuence detector means and said relative time detector means.

3. An apparatus for detecting and identifying a tribit signal, the signal so tested is produced when a transducer reads a particular track on a rotary disk, said apparatus comprising:
   a frequency testing means, connected to the transducer, for determining whether the positive pulse appears at the frequency rate characteristic of tribit signals and producing an affirmative indication when this frequency characteristic is detected;
   a relative time detecting means, connected to the transducer, for detecting the presence of the tribit characteristic feature of a negative pulse occurring at a specified time interval after the occurrence of a positive pulse and producing an affirmative indication when the relative time characteristic is detected; and,
   a coincidence means, connected to the output of said frequency testing means and said relative time detecting means for generating a tribit-present-signal when affirmative indicators are received from said frequency testing means and said relative time detecting means.

4. The apparatus of claims 1, 2, or 3, further comprising:
   a head position indicating means for generating a signal indicating that the transducer head has been moved to the general radial area where the tribit track is located; and,
   a supplemental coincidence means for making the signal generated by said head position indicator means an additional simultaneous required input condition to said signal coincidence means for the generation of the tribit-track-present signal.

5. An apparatus for detecting and identifying a tribit signal, the signal so tested is produced when a transducer reads a particular track on a rotary disk, said apparatus comprising:
   a sequence detector means, connected to the transducer, for detecting the presence of the tribit characteristic feature of two negative pulses for every positive pulse and producing an affirmative indication when the sequence characteristic is detected;
   a frequency testing means, connected to the transducer, for determining whether the positive pulse appears at the frequency rate characteristic of tribit signals and producing an affirmative indication when this frequency characteristic is detected;
   a relative time detector means, connected to the transducer, for detecting the presence of the tribit characteristic feature of a negative pulse occurring at a specified time interval after the occurrence of a positive pulse and producing an affirmative indication when this relative time characteristic is detected; and,
   a coincidence means, connected to the output of said sequence detector means and said frequency testing means, and said relative time detecting means, for generating a tribit-present-signal when affirmative indicators are received from said sequence detector means, said frequency testing means, and said relative time detecting means.

6. An apparatus for detecting and identifying a tribit signal, the signal so tested is produced when a transducer reads a particular track on a rotary disk, said apparatus comprising:

a sequence detector means, connected to the transducer, for detecting the presence of the tribit characteristic feature of two negative pulses for every positive pulse and producing an affirmative indication when the sequence characteristic is detected;

a frequency testing means, connected to the transducer, for determining whether the positive pulse appears at the frequency rate characteristic of tribit signals and producing an affirmative indication when this frequency characteristic is detected;

a relative time detecting means, connected to the transducer, for detecting the presence of the tribit characteristic feature of a negative pulse occurring at a specified time interval after the occurrence of a positive pulse and producing an affirmative indication when the relative time characteristic is detected;

a head position indicating means for generating a signal indicating that the system transducer head has been moved to the general radial area where the tribit track is located; and, a coincidence means, connected to the output of said sequence detector means, said frequency testing means, said relative time detecting means, and said head position indicator means for generating a tribit-present-signal when affirmative indicators are received from said sequence detecting means, said frequency testing means, said relative time detecting means, and said head position indicator means.

7. An apparatus for detecting and identifying a tribit signal, the signal so tested is produced when a transducer reads a particular track on the rotary disk, said apparatus comprising:

a positive peak detector means, responsive to the signal produced by the transducer, for cancelling all signal elements except for the positive pulses in the reproduced signal;

a positive digital low pass filter means, responsive to the positive pulse signal produced by the positive peak detector means, for cancelling all positive pulses having a frequency greater than the frequency occurrence of the tribit servo signal positive pulses;

a negative peak detector means, responsive to the reproduce signal from the transducer, for cancelling all signal elements in the reproduce signal except for negative pulses;

a negative low pass filter means, responsive to the output from said negative peak detector means, for cancelling all remaining signal elements, having a frequency of occurrence greater than the typical shorter time interval between the negative time pulses and the tribit signals;

a digital band pass filter means, responsive to the output from said positive digital low pass filter means, for cancelling all signal elements that do not fall in substantially the same time frame as the occurrence of the tribit servo signal positive pulses and for transmitting this resulting time frame signal as an output;

a sequence detector means, responsive to the outputs from both said positive digital low pass filter means and said negative digital low pass filter means, for generating an affirmative signal indication when the reproduce signal contains two negative pulses for each positive pulse;

a time detector means, responsive to the outputs from said positive peak detector means and said negative peak detector means, for generating an affirmative indication when the time relationship, in the reproduce signal, between any positive pulse and the first successive negative pulse is substantially the same as the basic tribit signal and for producing an affirmative indication when said relative time characteristic is detected;

a head position indicator means for generating a positive indicating signal when the system transducer head has been moved to the general radial area where the tribit track is located; and, a coincidence means, connected to the output of said head position indicator means, digital band pass filter means, sequence detector means, and time detector means, for generating a tribit-present-signal when the affirmative indcators are received from said head position indicator means, digital band pass filter means, sequence detector means and time detector means.

8. Apparatus according to claims 1, 3, 5, or 6, wherein said frequency testing means includes:

a positive pulse detector means, responsive to the signal produced by the transducer, for cancelling all signal elements except for positive pulses in the reproduced signal;

a positive digial low pass filter means, responsive to the positive pulse signal produced by said positive peak detector means, for cancelling all positive pulses having a frequency greater than the frequency occurrence of the tribit servo signal positive pulses; and, a band pass filter means, responsive to the output from said positive digital low pass filter means, for cancelling all signal elements that do not fall in substantially the same time frame as the occurrence of the tribit servo signal positive means, and for transmitting this resulting time frame signal to said signal coincidence means.

9. The apparatus according to claims 1, 2, 5, or 6, wherein said sequence detector means includes:

a negative peak detector means, responsive to the reproduce signals from the transducer, for cancelling all signal elements in the reproduce signal except for negative pulses;

a negative digital low pass filter means, responsive to the output from said negative peak detector means, for cancelling all remaining signal elements, having a frequency of occurrence greater than the typical shorter time interval between the negative pulses of the tribit signal; and, a detector means, responsive to the outputs from both said positive digital low pass filter means and said negative digital low pass filter means, for generating an affirmative signal indication when the reproduce signal contains two negative pulses for each positive pulse, and for transmitting this affirmative indication to said signal coincidence means.

10. The apparatus according to claims 2, 3, 5, or 6, wherein said relative time detector means includes:

a positive peak detector means, responsive to the signal produced by the transducer, for cancelling all signals except for the positive pulses in the reproduced signal;

a negative peak detector means, responsive to the reproduce signal from the transducer, for cancelling all signal elements in the reproduce signal except for negative pulses; and, a time detector means, responsive to the outputs of said positive peak detector means and said negative peak detector means, for generating an affirmative indication when the time relationship, in the reproduce signal, between any positive pulse and the first successive negative pulse is substantially the same as in the basic tribit signal, and for transmitting said affirmative indication to said signal coincidence means.

* * * * *